Figure 1:
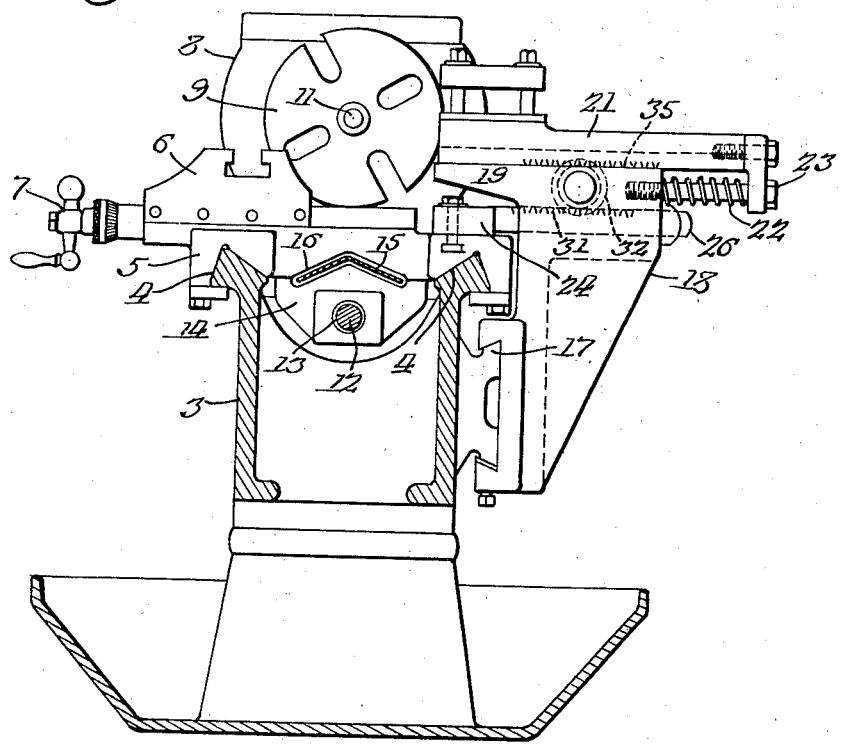

L. G. DANIELS.
LATHE.
APPLICATION FILED MAR. 19, 1919.

1,393,206. Patented Oct. 11, 1921.

Inventor:
Lee G. Daniels
Ira J. Wilson

UNITED STATES PATENT OFFICE.

LEE G. DANIELS, OF ROCKFORD, ILLINOIS.

LATHE.

1,393,206.   Specification of Letters Patent.   Patented Oct. 11, 1921.

Application filed March 19, 1919. Serial No. 283,490.

*To all whom it may concern:*

Be it known that I, LEE G. DANIELS, a citizen of the United States, residing at Rockford, in the county of Winnebago and State of Illinois, have invented certain new and useful Improvements in Lathes, of which the following is a specification.

This invention pertains in general to lathes, especially to those adapted for metal turning, and has for its principal object the provision of novel means for supporting and feeding a cross tool slide such as carries back facing tools toward and from the work. Another important object resides in the arrangement of the lead screw for the main tool carriage and to the provision of a simple and effective means of novel construction for preventing chips and other matter from falling on the lead screw.

In furtherance of these general objects my invention contemplates the provision of a back facing tool slide adapted to be applied as an attachment to a lathe or to be permanently associated therewith, if desired; and novel mechanism for feeding the tool slide toward the work. This mechanism in its preferred form is exceedingly simple and permits the desired cross feed to be obtained in a very direct and practical manner. It consists, generally stated, of a cam on the main carriage arranged to actuate a slidable member meshing with a gear, which in turn meshes with the cross tool slide. Thus the main carriage when moved longitudinally on the bed, will through the few parts just described, transmit feed movement to the cross tool slide and bring the facing tools into operation with a fine degree of precision. I have also arranged the cam actuated member in an advantageous manner, so that the cam thrust will be applied most directly to said member, and I have further mounted the gear in such manner that it may be quickly unmeshed from the cross tool slide for permitting quick adjustment of the same relatively to the cam actuated member. As regards the second feature of my invention, I have arranged the lead screw centrally between the longitudinal ways on the bed as distinguished from those constructions in which the lead screw is arranged either at the outer side of the bed or in an offset relation between the ways and thereby imposing an uneven strain on the carriage and ways. Such construction does not enable the direct and equal distribution of force which follows from arranging the lead screw in line with the center of the lathe. A lead screw in this central position has been, however, objectionable as it was difficult to protect it from the falling chips which would be ground into the nut on the carriage. I overcome this objection by the provision of a stationary guard positioned above the lead screw and passing through an opening in the carriage so as not to interfere with the latter. This guard preferably extends from the head stock to the opposite end of the lathe, and has downwardly sloping sides which deflect the chips downwardly and outwardly toward the sides of the bed, and thus effectually prevents the chips from engaging or lodging on the screw.

Other objects and attendant advantages will be appreciated as the invention becomes better understood by reference to the following specification when considered in connection with the accompanying drawing, in which—

Figure 2:
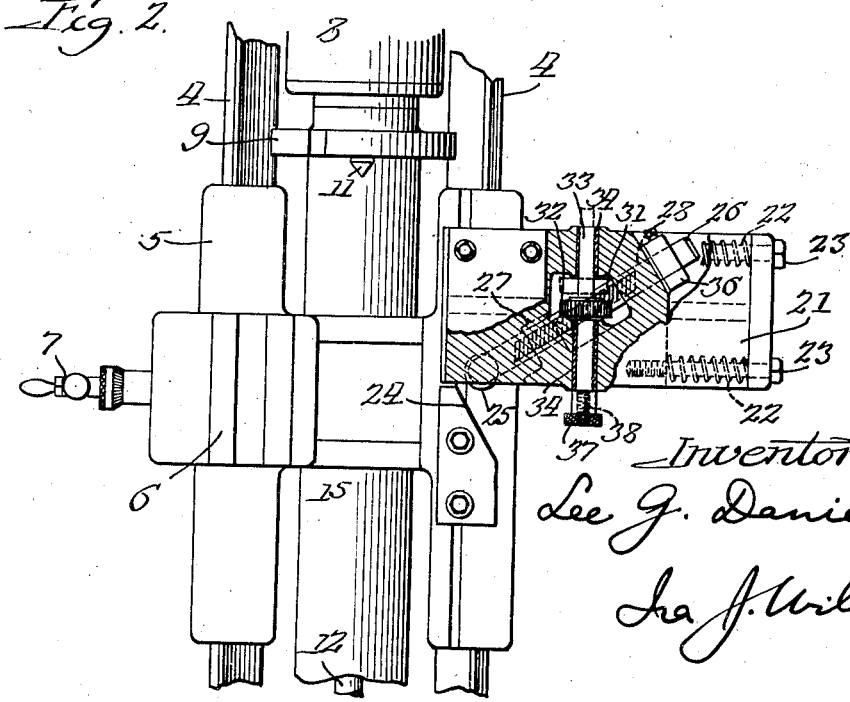

Figure 1 is a cross-sectional view through a lathe embodying my improvements, looking toward the head stock; and Fig. 2 is a fragmentary plan view of the parts pertinent to the present invention.

Since my improvements relate simply to the mounting and means for operating a cross tool slide adapted for back facing, and to the arrangement and protection of a lead screw for moving the main carriage longitudinally on the bed, I have confined the drawings to these parts. The improvements may be embodied in a lathe of any suitable or preferred construction, and that illustrated in the drawing is one of a conventional design having a bed 3 provided with ways 4 on which is mounted a carriage 5 carrying the usual tool rest or slide 6 and hand screw adjustment 7 therefor. A head stock 8 is also indicated with a face plate 9 and center 11 in working position. The carriage 5, however, is different from the ordinary construction in that it does not include an apron at the front and usual mechanism carried thereby for engaging the lead screw. Instead however, the lead screw 12 is arranged centrally between the ways 4 or co-planar with the center of the lathe. The screw threadingly engages the nut 13 fixed to the carriage which, as shown in Fig. 1, has a central depending portion 14 establishing a rigid and substantial support for the nut. Any suitable mechanism may be employed for rotating the lead screw to move the carriage 5 longitudinally on the bed. It will be noted that by arranging the lead screw in this manner the power is applied to the carriage centrally between the ways 4 and substantially directly below the working point of the tool. It follows that the working strain on the several parts and on the ways 4 will be equally distributed as distinguished from those types of lathes in which the lead screw is arranged in front of the bed or to one side of the center and in which an uneven strain is imposed on the ways and other parts. The lead screw arranged in the center is, therefore, better mechanical construction than when positioned off to one side. It is now necessary, and in fact essential, to protect the lead screw from falling chips and while various means of more or less complicated and ineffectual constructions have been provided, they are, so far as I am aware, not suited for practical, commercial purposes. In the present case, I provide a shield or guard 15 overlying the lead screw and having downwardly sloping sides which deflect the falling chips outwardly toward the side walls of the bed. This guard extends preferably from the head stock, substantially to the opposite end of the lathe and is suitably supported at its ends in the position shown in Fig. 1. In order to avoid interference with the carriage 5, the latter is provided with an opening 16 through which the guard 15 passes. Thus, the carriage is movable along the bed to any position entirely independent of the guard 15, and the lead screw will be fully protected regardless of the working position of the tool. It will be noted that this construction imposes no limitations on the arrangement of gearing or other mechanism in the head or tail stocks, as in those instances where sliding shields have been provided.

Referring now to the feature of the tool slide adapted for carrying back facing tools, it will be noted that this might be considered an attachment adapted to be applied to any lathe equipped with suitable ways for the purpose. In the present instance, I have constructed the bed to provide vertically disposed ways 17 at the rear of the bed and below the main ways 4, and upon which a suitable carriage or standard designated generally by character 18, is mounted. The particular arrangement of the ways 17 is not important, as these might be arranged horizontally, or in any suitable manner. It is important, however, that the carriage 18 shall be constructed to extend inwardly above the ways 4 at the back of the lathe as at 19 to provide the necessary support for a cross tool slide 21. This tool slide is mounted on suitable ways on the upper end of the carriage 18 and adapted to travel in a plane transverse to the longitudinal axis of the lathe to bring facing tools or tools of this type into and out of operation. The use of back facing tools of this kind is well known in the art. Suitable means is provided for constantly urging the cross tool slide away from the center of the lathe to an inoperative position, and in the present instance this consists of a pair of expansion springs 22 supported by bolts 23 and acting between the carriage 18 and the cross slide to move the latter away from the lathe center, that is, to the right viewing Fig. 1, as will be obvious.

I have aimed to provide means for imparting feed movement to the slide 21 in a most simple and direct manner and to obtain the fine degree of accuracy necessary in machines of this kind; also to so construct this feed mechanism that it is capable of production at a comparatively low cost and readily adapted for quick and easy adjustment to properly govern the tool action, and which is capable of embodiment in a thoroughly practical, workable construction. To these ends, my invention contemplates, generally stated, operation of the slide 21 from a cam on the carriage 5 through the agency of a cam-actuable member meshing with a gear in turn meshing with the tool slide. As plainly indicated in the drawing, the cam 24 adjustably mounted on the carriage 5 is adapted to engage the roller-equipped end 25 of a member 26 mounted in the bearings 27 and 28 on the carriage 18 and to slide this member in its bearings away from the center of the lead. This member is provided on its upper surface with a rack face 31 with which meshes a gear 32 fixed to a shaft 33 mounted in the bearings 34 on the carriage 18. The gear 32 in turn meshes with a rack 35 fixed to the slide 21. From this construction, it will be seen that when the member 26 is moved outwardly the tool slide 21 will be moved inwardly, and vice versa. The outward movement of the tool slide under the influence of the springs 22 is limited by a stop 36 on the outer end of the member 26. The cam surface may be of any suitable shape or design to suit the particular conditions and requirements at hand, and as shown, a straight inclined surface is provided, which will impart a gradual feed movement to the tools carried by the slide 21 in direct proportion to the feed movement of the carriage 5. In order that the carriage movement may be imparted to the member 26 in a most direct line of force, I have arranged the member 26 at substantially right angles to the plane of inclination of the cam surface 24 as plainly shown in Fig. 2; and in such case the teeth 31 are cut at an angle to the longitudinal axis of the member 26 to properly mesh with the gear 32. As noted in this figure, the carriage 18 is shaped to permit movement of the gear 32 longitudinally of its axis to withdraw the gear from the rack 35, whereupon the tool slide 21 may be moved longitudinally on its ways independently of the member 26 to adjust the position of the tools. In order to effect this shifting of the gear quickly and easily, I have threadingly mounted a cap 37 on the reduced end 38 of the shaft 33, so that by unscrewing this cap, but not removing it, the shaft 33 may be slid axially to the dotted line position indicated in Fig. 2, thereby unmeshing the gear 32. Upon returning the gear to its working position by tightening the cap 37, the gear will be properly held in such position. It will thus be seen that when the carriage 5 is moved toward the head stock by means of the lead screw 12 or by power through any other agency, the cam 24 will force the member 26 outwardly, thereby revolving the gear 32 in a counter-clockwise direction viewing Fig. 1, and feeding the tool slide inwardly to bring the facing or shoulder tools, or whatever form of tools which might be employed, into operation. During this feed movement, the springs 22 will be compressed, and when the carriage 5 returns the springs 22 will function to return the tool slide 21 to a position limited by the stop 36. It will be noted that the carriage 5 is capable of considerable movement on the bed independently of movement of the tool slide 26, by reason of the fact that the latter is moved only when the cam on the carriage 5 is in coöperative engagement with the member 26.

It is believed that the foregoing conveys a clear understanding of the principles of my invention and of the objects prefaced above, and while I have illustrated but one working embodiment thereof, it should be understood that various changes might be made in the construction and arrangement without departing from the spirit and scope of the invention as expressed in the appended claims, in which—

I claim:

1. In a lathe, the combination of a bed, a tool carriage movable longitudinally thereon, a back facing tool slide movable crosswise of the bed, a rack on the tool slide, a gear meshing with the rack, a cam-actuable member meshing with the gear, and a cam on the carriage for actuating said member through longitudinal movement of said carriage to thereby feed the tool slide crosswise of the bed.

2. In a lathe, the combination of a bed, a carriage movable lengthwise thereon, a cross tool slide, means constantly urging the cross tool slide away from the center of the lathe, a gear for moving the cross tool slide toward said center, a cam on the first mentioned carriage, and a slidable member meshing with said gear and arranged to be operated by said cam for moving the cross tool slide toward the center of the lathe.

3. A back facing tool slide attachment for lathes comprising in combination with a lathe bed having a main tool carriage and ways for supporting the back facing tool slide, of a carriage or standard adapted to be rigidly mounted on said ways and provided with ways transverse to the longitudinal axis of the lathe, a cross tool slide mounted on said transverse ways, a member mounted on the standard to slide toward and from the center of the lathe, a cam surface movable longitudinally of the bed and adapted to slide said member lengthwise, and a gear connection between said member and the cross tool slide for moving the same on its ways through longitudinal movement of said cam surface.

4. In a lathe, the combination with a carriage movable longitudinally on the bed, of a cross tool slide, a member disposed below the cross tool slide and movable toward and from the center of the lathe, a gear interposed between the cross tool slide and said member and in mesh therewith, and a cam on the carriage for sliding said member to move the cross tool slide toward the center of the lathe through the agency of said gear, said gear being movable out of mesh with the cross tool slide to permit cross adjustment of the same relatively to said slidable member.

5. In a lathe, the combination of a tool carriage movable longitudinally on the bed and equipped with a cam, a cross tool slide, a gear meshing with the cross tool slide and adapted to be rotated for moving the same toward the center of the lathe, and a member in mesh with said gear and mounted to slide in a plane substantially at right angles to the inclined plane of the cam and adapted to be operated by the latter to feed the cross tool slide toward the center of the lathe.

6. The combination of a bed having longitudinal ways, a tool carriage mounted to travel on said ways, a cross tool slide movable transversely to said ways, a cam on the first carriage, a member adapted to be actuated by said cam upon movement of the carriage, and a gear interposed between and meshing with the cross tool slide and said member for transmitting feed movement to the cross tool slide by similar movement of the carriage.

LEE G. DANIELS.